US009336659B2

(12) United States Patent
Beria

(10) Patent No.: US 9,336,659 B2
(45) Date of Patent: May 10, 2016

(54) GAMING DEVICE AND METHODS OF ALLOWING A PLAYER TO PLAY A GAMING DEVICE HAVING SELECTABLE AWARDS

(71) Applicant: Konami Gaming, Inc., Las Vegas, NV (US)

(72) Inventor: Majgan Beria, Las Vegas, NV (US)

(73) Assignee: KONAMI GAMING, INC., Las Vegas, NV (US)

( * ) Notice: Subject to any disclaimer, the term of this patent is extended or adjusted under 35 U.S.C. 154(b) by 0 days.

(21) Appl. No.: 14/513,667

(22) Filed: Oct. 14, 2014

(65) Prior Publication Data

US 2015/0287286 A1 Oct. 8, 2015

(30) Foreign Application Priority Data

Apr. 2, 2014 (AU) ................................ 2014201890

(51) Int. Cl.

| | |
|---|---|
| ***A63F 13/00*** | (2014.01) |
| ***G07F 17/34*** | (2006.01) |
| ***G07F 17/32*** | (2006.01) |

(52) U.S. Cl.
CPC ............ *G07F 17/34* (2013.01); *G07F 17/3213* (2013.01); *G07F 17/3267* (2013.01)

(58) Field of Classification Search
USPC ...................................................... 463/16–42
See application file for complete search history.

(56) References Cited

U.S. PATENT DOCUMENTS

| | | | | |
|---|---|---|---|---|
| 6,443,452 | B1 | 9/2002 | Brune | |
| 6,769,984 | B2 | 8/2004 | Duhamel et al. | |
| 8,187,089 | B2 | 5/2012 | Englman et al. | |
| 8,210,932 | B2 | 7/2012 | Shiraishi | |
| 8,303,400 | B2 | 11/2012 | Okada | |
| 2002/0025848 | A1 | 2/2002 | Graham et al. | |
| 2003/0069056 | A1 | 4/2003 | Cormack et al. | |
| 2005/0079908 | A1 | 4/2005 | Pacey | |
| 2007/0032285 | A1 | 2/2007 | Wolf | |
| 2007/0077978 | A1 * | 4/2007 | Walker et al. | 463/16 |
| 2007/0155485 | A1 * | 7/2007 | Cuddy et al. | 463/25 |
| 2008/0139285 | A1 | 6/2008 | Zimmermann | |
| 2009/0017906 | A1 * | 1/2009 | Jackson | 463/26 |

(Continued)

FOREIGN PATENT DOCUMENTS

JP 2007-175227 A 7/2007

OTHER PUBLICATIONS

Patent Examination Report No. 1 (AU 2014201890); Date of Issue: Apr. 24, 2014.

(Continued)

*Primary Examiner* — Masud Ahmed
(74) *Attorney, Agent, or Firm* — Howard & Howard Attorneys PLLC

(57) ABSTRACT

A gaming machine for providing a slot game to a player is described herein. The gaming machine includes a display device and a controller for displaying a game to a player. The controller is configured to randomly determine an outcome of the game and display the outcome on the display device, determine a first award as a function of the outcome, and determine a second award as a function of the first award. The first award includes a first number of free games and a first award multiplier. The second award includes a second number of free games and a second award multiplier. The controller allows the player to select one of the first award and the second award and responsively provides the selected one of the first award and the second award to the player.

20 Claims, 13 Drawing Sheets

(56) References Cited

U.S. PATENT DOCUMENTS

| | | | | |
|---|---|---|---|---|
| 2011/0312409 | A1* | 12/2011 | Vancura | 463/25 |
| 2013/0065662 | A1 | 3/2013 | Watkins et al. | |
| 2013/0079123 | A1* | 3/2013 | Nicely et al. | 463/26 |
| 2013/0084941 | A1* | 4/2013 | Caputo et al. | 463/20 |

OTHER PUBLICATIONS

Notice of Reasons for Rejection (JP 2014-214513); Dispatched Jan. 26, 2016.

* cited by examiner

GAMING DEVICE AND METHODS OF ALLOWING A PLAYER TO PLAY A GAMING DEVICE HAVING SELECTABLE AWARDS

CROSS REFERENCE TO RELATED APPLICATION

This application claims priority to Australian Patent Application No. 2014201890, filed Apr. 2, 2014, the disclosure of which is hereby incorporated by reference in its entirety.

COPYRIGHT NOTICE

The figures included herein contain material that is subject to copyright protection. The copyright owner has no objection to the facsimile reproduction by anyone of this patent document as it appears in the U.S. Patent and Trademark Office, patent file or records, but reserves all copyrights whatsoever in the subject matter presented herein.

TECHNICAL FIELD

The subject matter disclosed herein relates generally to gaming devices and more particularly, to an apparatus and method for allowing players to play a game including selectable awards.

BACKGROUND OF THE INVENTION

Known gaming devices include a video display device to display a reel game that includes a plurality of reels with each reel including a plurality of symbols. During game play, the gaming device accepts a wager from a player, the player selects one or more paylines, the gaming device spins the reels, and sequentially stops each reel to display a combination of symbols on the reels. The gaming device then awards the player an award based on the combination of symbols orientated along the selected payline.

At least some known gaming devices provide bonus features that include a free game mode in which a number of free games and/or free spins are awarded to the player. The free games and free spins do not require a wager from the player. During the free game mode, known gaming devices automatically play each free game and spin and stop the reels to display each outcome of each free game without requiring any interaction by the player. Because some known gaming devices award a substantial number of free games to players, the time required to display each outcome of each free game may be significant. Overtime, the player may become frustrated with the amount of time required to play the free game mode and/or the lack of player interaction that is required during the free game mode.

Accordingly, new features are necessary to appeal to player interest and enhance excitement in order to entice longer play and increased profitability. The present invention is directed to satisfying these needs.

SUMMARY OF THE INVENTION

In one aspect of the present invention, a gaming machine for providing a slot game to a player is provided. The gaming machine includes a display device and a controller coupled to the display device for displaying a game to a player. The game includes a plurality of reels being displayed in a grid. The controller is configured to randomly determine an outcome of the game and display the outcome on the display device, determine a first award as a function of the outcome, and determine a second award as a function of the first award. The first award includes a first number of free games and a first award multiplier being associated with the first number of free games. The second award includes a second number of free games and a second award multiplier being associated with the second number of free games. The second number of free games is different than the first number of free games. The controller allows the player to select one of the first award and the second award and responsively provides the selected one of the first award and the second award to the player.

In another aspect of the present invention, a method of allowing a player to play a slot game with a gaming machine is provided. The method includes displaying a game including a plurality of reels being displayed in a grid, randomly determining an outcome of the game and displaying the outcome on the display device, determining a first award as a function of the outcome, and determining a second award as a function of the first award. The first award including a first number of free games and a first award multiplier being associated with the first number of free games. The second award including a second number of free games and a second award multiplier being associated with the second number of free games. The second number of free games is different than the first number of free games. The method may also include allowing the player to select one of the first award and the second award and responsively providing the selected one of the first award and the second award to the player.

In yet another aspect of the present invention, one or more non-transitory computer-readable storage media, having computer-executable instructions embodied thereon, is provided. The computer-executable instructions cause a processor to display a game to a player, randomly determine an outcome of the game and display the outcome on the display device, determine a first award as a function of the outcome, and determine a second award as a function of the first award. The first award includes a first number of free games and a first award multiplier being associated with the first number of free games. The second award includes a second number of free games and a second award multiplier being associated with the second number of free games. The second number of free games is different than the first number of free games. The computer-executable instructions may also cause a processor to allow the player to select one of the first award and the second award and responsively provide the selected one of the first award and the second award to the player.

BRIEF DESCRIPTION OF THE DRAWINGS

Other advantages of the present invention will be readily appreciated as the same becomes better understood by reference to the following detailed description when considered in connection with the accompanying drawings wherein.

Corresponding reference characters indicate corresponding parts throughout the drawings.

DETAILED DESCRIPTION OF THE PREFERRED EMBODIMENT

With reference to the drawings and in operation, the present invention overcomes at least some of the disadvantages of known gaming devices by providing a gaming device that displays a bonus feature that allows the player to select awards to be provided to the player. In addition, the gaming device determines a plurality of awards as a function of an outcome of a main game and allows the player to select one of the plurality of awards to be provided to the player during a bonus game. More specifically, the gaming device provides a first award to the player as a function of the outcome of the main game, determines a second award as a function of the first award, and allows the player to select the first award or the second award. For example, the gaming device may provide the first award including a first number of free spins at a first award multiplier and determine the second award to include a lower number of free spins at a higher award multiplier as compared to the first award. By allowing the player to select the first award or the second award, the excitement of the player is increased by allowing the player to select a potentially higher award payout.

In addition, upon selection of the award, the gaming device displays a free game mode during which the gaming device generates and displays the outcomes of each free game. During the free game mode, after each free game is displayed, the gaming device determines a remaining number of free games and displays a bonus feature selection indicator that allows the player to display a bonus selection screen to again make a selection between different awards. Thus, the gaming device increases the player's interaction during the free game mode and increases the player's involvement in the type of award being provided to the player. Thus, the amount of time that the game is played by patrons of a gaming establishment is thereby increased.

A selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 1:
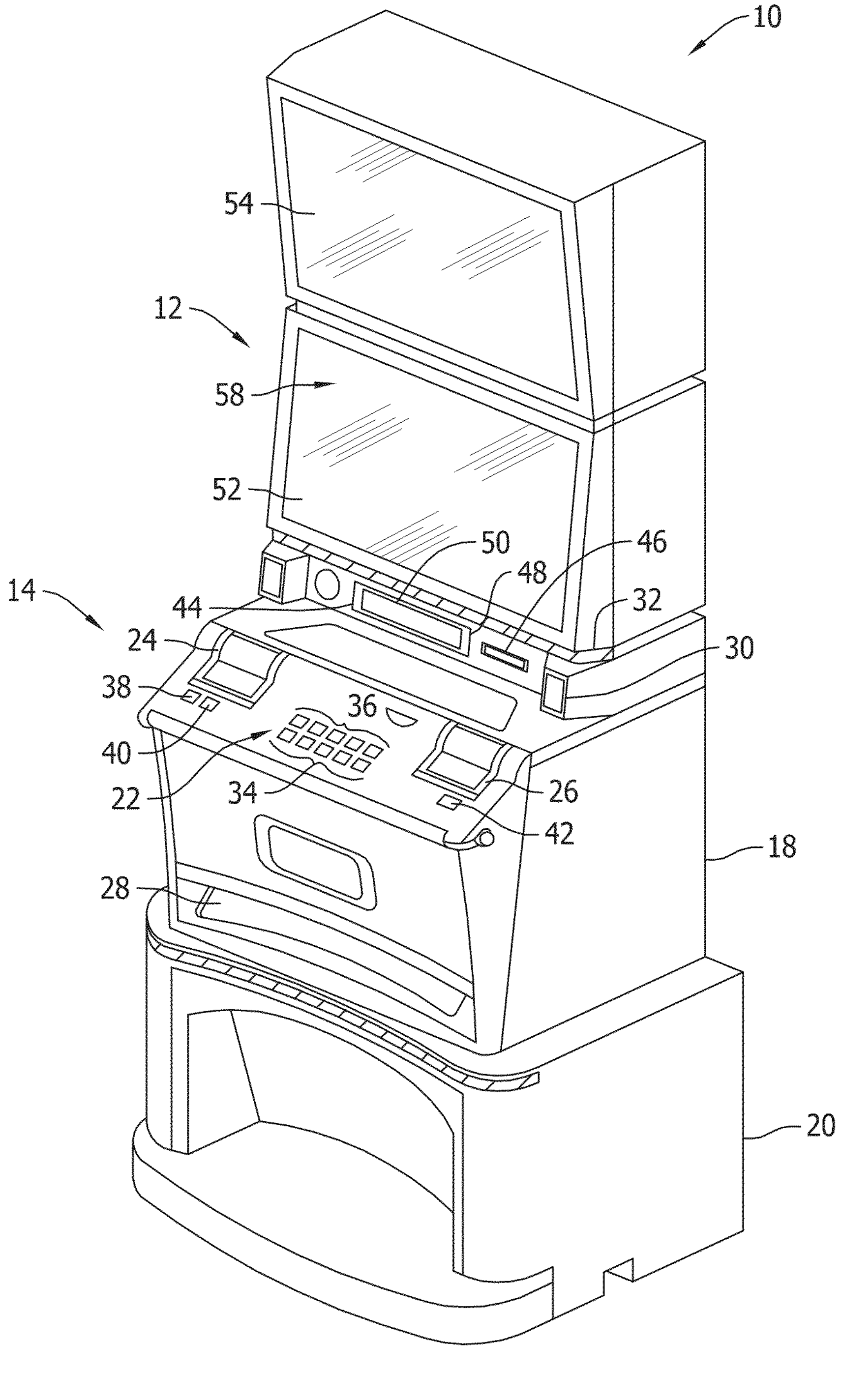
FIG. 1 is a perspective view of an exemplary gaming device of the present invention.
Figure 2:
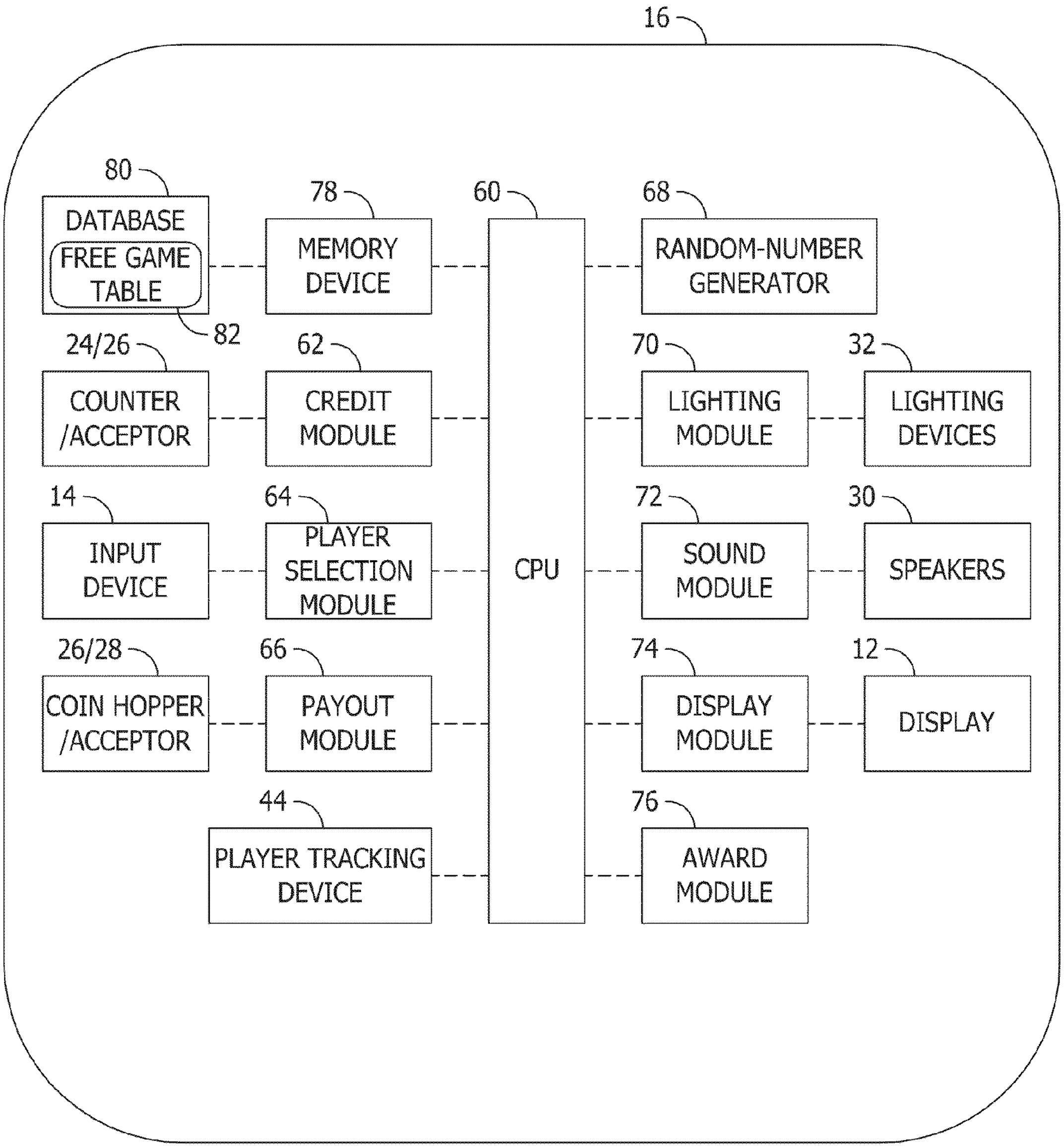
FIG. 2 is a schematic representation of the gaming device shown in FIG. 1.

FIG. 1 is a perspective view of an exemplary gaming device 10. FIG. 2 is a schematic representation of the gaming device 10. A preferred embodiment of the present invention is an electronic gaming machine preferably installed in a casino. In the illustrated embodiment, the gaming device 10 includes a display device 12 for displaying a plurality of games, a user input device 14 to enable a player to interface with the gaming device 10, and a gaming controller 16 that is operatively coupled to the display device 12 and the user input device 14 to enable a player to play games being displayed on the display device 12. The gaming device 10 also includes a cabinet assembly 18 that is configured to support the display device 12, the user input device 14, and/or the gaming controller 16 from a gaming stand 20 and/or a supporting surface.

The display device 12 and the user input device 14 are each coupled to the cabinet assembly 18 and are each accessible by the player. In one embodiment, the gaming controller 16 is positioned within the cabinet assembly 18. Alternatively, the gaming controller 16 may be separated from the cabinet assembly 18, and connected to components of the gaming device 10 through a network such as, for example, a local area network (LAN), a wide area network (WAN), dial-in-connections, cable modems, wireless modems, and/or special high-speed Integrated Services Digital Network (ISDN) lines.

In one embodiment, the user input device 14 includes a plurality of input buttons 22, a coin slot 24, and/or a bill acceptor 26. The coin slot 24 includes an opening that is configured to receive coins and/or tokens deposited by the player into the gaming device 10. The gaming controller 16 converts a value of the coins and/or tokens to a corresponding amount of gaming credits that are used by the player to wager on games played on the gaming device 10.

The bill acceptor 26 includes an input and output device that is configured to accept a bill, a ticket, and/or a cash card into the bill acceptor 26 to enable an amount of gaming credits associated with a monetary value of the bills, ticket, and/or cash card to be credited to the gaming device 10. Moreover, the gaming device 10 may also utilize a cashless wagering system (not shown), such as a ticket in ticket out (TITO) system (not shown). In one embodiment, the bill acceptor 26 also includes a printer (not shown) that is configured to dispense a printed voucher ticket that includes information indicative of an amount of credits and/or money paid out to the player by the gaming device 10 during a gaming session. The voucher ticket may be used at other gaming devices, or redeemed for cash, and/or other items as part of a casino cashless system (not shown).

A coin hopper 28 is coupled to the cabinet assembly 18 and is configured to receive a plurality of coins that are dispensed from the gaming device 10. One or more speakers 30 are installed inside the cabinet assembly 18 to generate voice announcements and/or sound effects associated with game play. The gaming device 10 also includes one or more lighting devices 32 that are configured to blink and/or change brightness and color in specific patterns to produce lighting effects to enhance a visual gaming experience for the player.

In one embodiment, the input buttons 22 include a plurality of BET switches 34 for inputting a wager on a game, a plurality of selection switches 36 for selecting a betting line, a payline, and/or card, a MAXBET switch 38 for inputting a maximum wager, a PAYOUT switch 40 for ending a gaming session and dispensing accumulated gaming credits to the player, and a start switch, i.e., a SPIN/DEAL button 42 to initiate an output of a game.

In the illustrated embodiment, the BET switches 34 include five switches from 1BET to 5BET to enable a player to wager between a minimum bet up to 5× minimum bet. Each selection switch 36 corresponds to a betting line such as, for example, a payline and/or symbol for a reel game, one or more cards for a card game, and/or a symbol for a roulette game, to enable a player to associate a wager with one or more betting lines. The MAXBET switch 38 enables a player to input the maximum bet that a player can spend against one play of a game. The PAYOUT switch 40 enables a player to receive the amount of money and/or credits awarded to the player during a gaming session, which has been credited onto the gaming device 10.

The gaming device 10 also includes a player tracking device 44 that is coupled to the gaming controller 16 for identifying the player and/or a player tracking account that is associated with the player. The player tracking account may include, but is not limited to, gaming credits available to the player for use in playing the gaming device 10. The player tracking device 44 is configured to communicate player account information between a player tracking controller (not shown) and the gaming device 10. For example, the player tracking device 44 may be used to track bonus points and/or credits awarded to the player during a gaming session and/or track bonus and/or credits downloaded to the gaming device 10 from the player tracking system. In the illustrated embodiment, the player tracking controller assigns a player status, e.g. a player ranking, based on the player account information. For example, the player tracking information may include, but is not limited to, a frequency in which the player plays a game, the average wager the player makes per play of a game, a total amount wagered by the player over a predefined period of time, and/or any other suitable player tracking information.

The player tracking device 44 is coupled to the gaming cabinet assembly 18 and includes a player identification card reader 46, a data display 48, and a keypad 50. The player identification card reader 46 is configured to accept a player tracking card (not shown) inserted by the player, and read information contained on the player tracking card to identify the player account information. The player identification card reader 46 may include, but is not limited to, a barcode reader, a magnetic card reader, and/or a radio frequency identification (RFID) card reader. The keypad 50 is configured to accept a user selection input such as, for example, a unique player personal identification number (PIN) to facilitate enabling the gaming device 10 to identify the player, and access player account information associated with the identified player to be displayed on the data display 48. In one embodiment, the data display 48 includes a touchscreen panel that includes the keypad 50. Alternatively, the data display 48 and the keypad 50 may be included in the display device 12.

In one embodiment, the display device 12 includes a first display 52 and a second display 54. The first display 52 is configured to display a game 56 on a game screen 58 (shown in FIGS. 4-10) including indicia and/or symbols for use in the game 56, e.g., cards used by a card game, roulette wheel and symbols used in a roulette game, and reels used in a reel game. The game 56 may include any type of game including, but not limited to, a video slot game, a keno game, a blackjack game, a video poker game, or any type of game which allows a player to make a wager, play a game, and potentially provide the player an award based on an outcome of the game and a paytable. The second display 54 is configured to display game play instructions for performing the game 56 including, but not limited to, playing instructions, paytables, paylines, betting lines and/or any other information to enable the gaming device 10 to function as described herein. Moreover, each display 52 and 54 may be configured to display at least a portion of the game screen 58 and/or game play instructions. In one embodiment, the first and second displays 52 and 54 each include a flat panel display, such as a cathode ray tube display (CRT), a liquid crystal display (LCD), a light-emitting diode display (LED), an organic light-emitting diode display (OLED), an active-matrix organic light-emitting diode display (AMOLED), a plasma display, and/or any suitable visual output device capable of displaying graphical data and/or text to a user. Alternatively, a single component, such as a touchscreen, may function as both the display device 12 and as the user input device 14. In an alternative embodiment, the first display 52 and/or the second display 54 includes a plurality of mechanical reels displaying a plurality of game symbols.

Referring to FIG. 2, in one embodiment, the gaming controller 16 includes a processor, i.e., a central processing unit (CPU) 60, a credit module 62, a player selection module 64, a payout module 66, a random-number generator (RNG) 68, a lighting module 70, a sound module 72, a display module 74, an award module 76, a memory device 78, and a database 80. The memory device 78 includes a computer readable medium, such as, without limitation, random access memory (RAM), read-only memory (ROM), erasable programmable read-only memory (EPROM), flash memory, a hard disk drive, a solid state drive, a diskette, a flash drive, a compact disc, a digital video disc, and/or any suitable device that enables the CPU 60 to store, retrieve, and/or execute instructions and/or data.

The CPU 60 executes various programs, and thereby controls other components of the gaming controller 16 according to player instructions and data accepted by the user input device 14. The CPU 60 in particular executes a game program, and thereby conducts a game in accordance with the embodiments described herein. The memory device 78 stores programs and databases used by the CPU 60. Moreover, the memory device 78 stores and retrieves information in the database 80 including, but not limited to, wagers, wager amounts, average wagers per game, a game type, a number of reels associated with a game, a number of symbols being displayed on each reel, a number of free spins associated with an award, image data for producing game images and/or screens on the display device 12, and temporarily stores variables, parameters, and the like that are used by the CPU 60. In addition, the memory device 78 stores indicia, symbol weights, symbol values, selection probability tables which represent relationships between selection probabilities and award multiplies and/or free games, paytables, and/or winning combination tables which represent relationships between combinations of random numbers and types of awards. In the illustrated embodiment, the database 80 also includes a free game selection table 82 that includes a list including a number of free games associated with a plurality of triggering conditions such as, for example, symbol combinations, special symbols, and/or total wagers. In one embodiment, the memory device 78 utilizes RAM to temporarily store programs and data necessary for the progress of the game, and EPROM to store, in advance, programs and data for controlling basic operation of the gaming device 10, such as the booting operation thereof.

The credit module 62 manages the amount of player's credits, which is equivalent to the amount of coins and bills counted and validated by the bill acceptor 26. The player selection module 64 monitors player selections received through the input buttons 22, and accepts various instructions and data that a player enters through the input buttons 22. The payout module 66 converts a player's credits to coins, bills, or other monetary data by using the coin hopper 28 and/or for use in dispensing a credit voucher via the bill acceptor 26.

The lighting module 70 controls one or more lighting devices 32 to blink and/or change brightness and color in specific patterns in order to produce lighting effects associated with game play. The sound module 72 controls the speakers 30 to output voice announcements and sound effects during game play. The display module 74 controls the display device 12 to display various images on a graphical interface 84 including the game screen 58 preferably by using computer graphics and image data stored in the memory device 78. More specifically, the display module 74 controls video reels in the game screen 58 displayed on the first display 52 and/or the second display 54 by using computer graphics and the image data. In another embodiment, the display device 12 includes a plurality of mechanical reels. The display module 74 is configured to control a rotation of each of the plurality of mechanical reels to spin and stop each reel to display a game outcome. In addition, the display module 74 may also display a plurality of user selection areas 86 (shown in FIGS. 6-11) within the graphical interface 84 that correspond to specific operations that may be initiated by the user. For example, in the illustrated embodiment, the display module 74 displays an award selection screen 88 that includes a plurality of awards, each being displayed with a selection area 86 to enable the user to select an corresponding award. Each of the selection areas 86 may receive a user selection input via the user input device 14.

The RNG 68 generates and outputs random numbers to the CPU 60 preferably at the start of each round of a game. The CPU 60 uses the random numbers to determine an outcome of the games. For example, if the game is a video slot game, the CPU 60 uses the RNG 68 to randomly select an arrangement of symbols to be displayed on video reels. Moreover, the CPU 60 generally uses random numbers generated by the RNG 68 to play the games and to determine whether or not to provide an award to a player. In one embodiment, the CPU 60 may also use the random numbers to determine a stop position of each reel for use in stopping each of a plurality of mechanical reels being displayed in the display device 12 to display the game outcome.

The award module 76 receives the game outcome from the CPU 60 including combinations of random numbers, and compares the generated combinations with winning combinations stored in the winning combination table to determine if the generated outcome is a winning outcome that is associated with a type of award. In general, the term "award" may be a payout, in terms of credits or money. Thus, the award module 76 may award a regular payout in response to the outcome of the game 56. However, it should be noted that the term award may also refer to other types of awards, including, prizes, e.g., meals, show tickets, etc. . . . , as well as in-game award, such as bonus features, free games, and/or free spins, or awarding the player one or more wild symbols or stacked wild symbols in each of the games. In one embodiment, the award module 76 may award a plurality of free games and/or free spins as a function of the outcome of the game. During a free game, the player is not required to place a wager. The gaming controller 16 randomly generates an outcome of the free game and spins and stops the reels to display the outcome of the free games and provides a free game award to the player as a function of the outcome. The free game award may include an amount of credits, additional free games, and/or any suitable type of award to be provided to the player.

In the illustrated embodiment, the award module 76 determines a first award as a function of the game outcome, determines a second award as a function of the first award, and allows the player to select the first award or the second award, and responsively provides the player the selected award. More specifically, the display module 74 displays the award selection screen 88 to the player (shown in FIG. 6) including the first and second awards and allows the player the select one of the first and second awards. For example, in one embodiment, the award module 76 may determine the first award to include a first number of free games, e.g. free spins, and determine the second award to include a second number of free games. The second number of free games may be greater than, less than, or equal to the first number of free games. The display module 74 displays each award to the player and allows the player to select one of the awards. The gaming controller 16 responsively provides the selected award to the player and generates and displays a number of free games corresponding to the number of free games provided in the selected award. In addition, the gaming controller 16 may generate an outcome for each of the free games and provide the player an award associated with each free game outcome. In the illustrated embodiment, the first and second awards each include a number of free games. In another embodiment, the first award may include a number of free games and the second award may include an amount of gaming credits.

In the illustrated embodiment, the award module 76 determines the first award including a first number of free games and determines a first award multiplier that is associated with each of the first number of free games. In addition, the award module 76 may also determine a second award multiplier that is associated with the second number of free games. The second multiplier may be greater than, less than, or equal to the first award multiplier. Each award multiplier multiplies an award amount that is associated with each of the free games. For example, in one embodiment, the player may select the first award including a first number of free games having an associated first award multiplier. For each free game of the first number of free games, the gaming controller 16 may generate an outcome associated with the free game and determine an award to be provided to the player as a function of the generated outcome including an amount of gaming credits multiplied by the first award multiplier.

In the illustrated embodiment, at least one of the first award and the second award includes a varying parameter. Moreover, the award module 76 determines the first award and/or the second award as a function of the varying parameter. For example, in one embodiment, the award module 76 may determine the first number of free spins being included in the first award as a function of one or more scatter symbols being displayed in the game outcome. By determining the first number of free spins as a function of the appearance of scatter symbols, the probability of being award the first number of free spins, and the amount of free spins being included in the first award may vary with each game outcome. In addition, the award module 76 may randomly determine the first award multiplier as a function of the game outcome. Moreover, the award module 76 may determine the second award including a second award multiplier that is randomly selected from a plurality of award multipliers.

Figure 3:
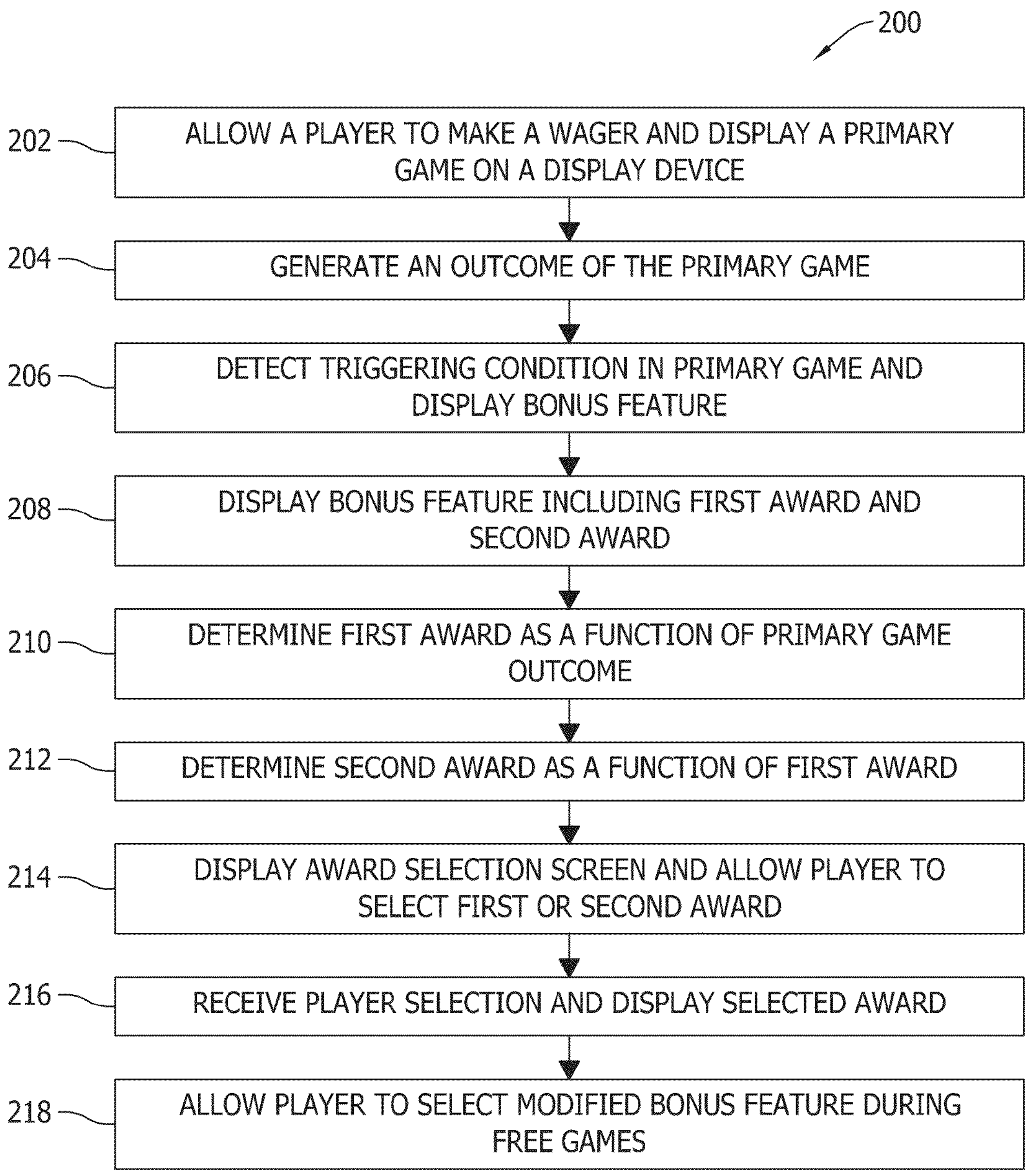
FIG. 3 is a flowchart of a method that may be used with the gaming machine shown in FIG. 1 for allowing a player to play a game having player selectable awards, according to an embodiment of the present invention.
Figure 4:
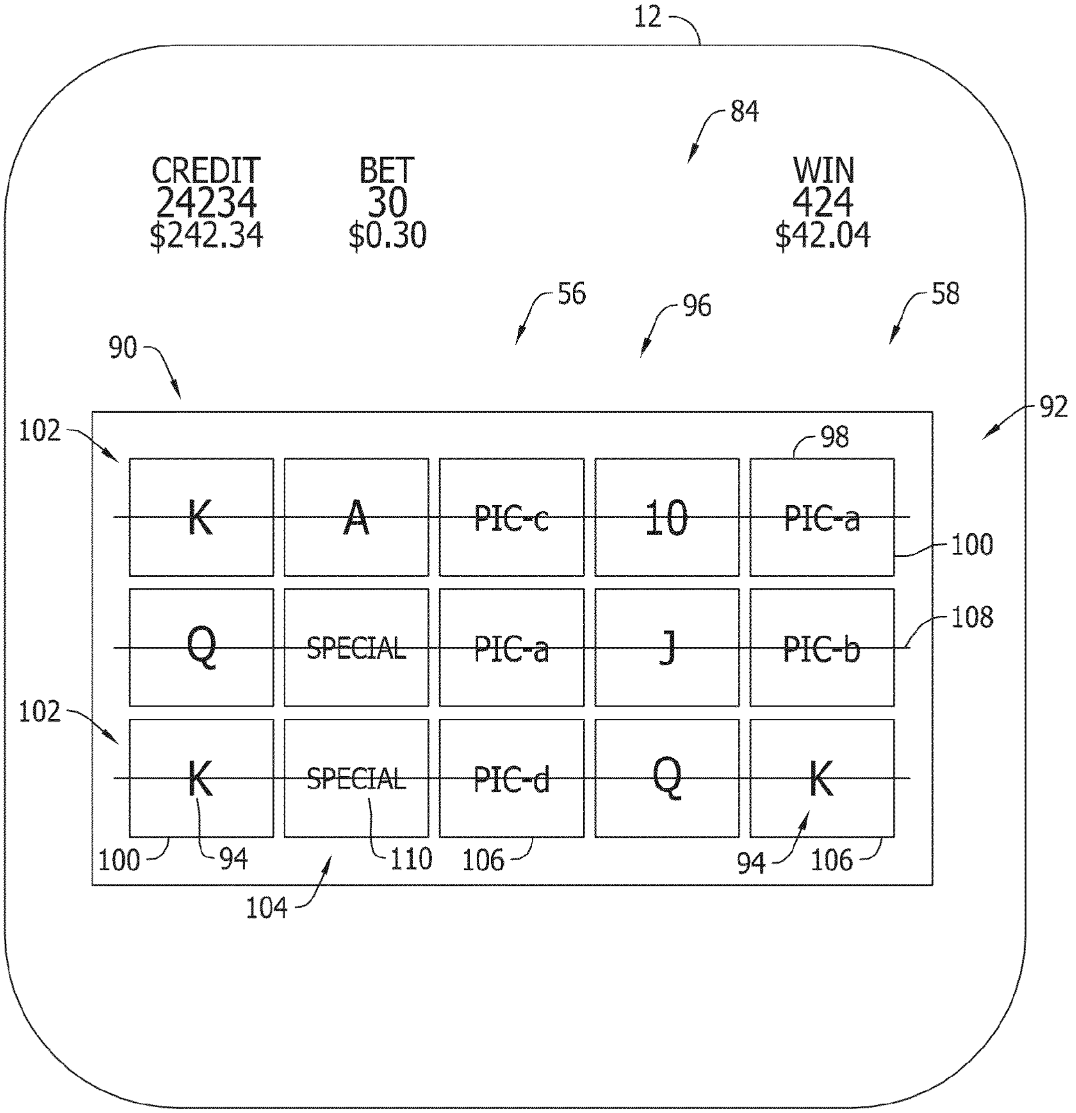
FIG. 4 is a graphical display of a slot game that may be displayed on the gaming device shown in FIG. 1, according to an embodiment of the present invention.
Figure 5:
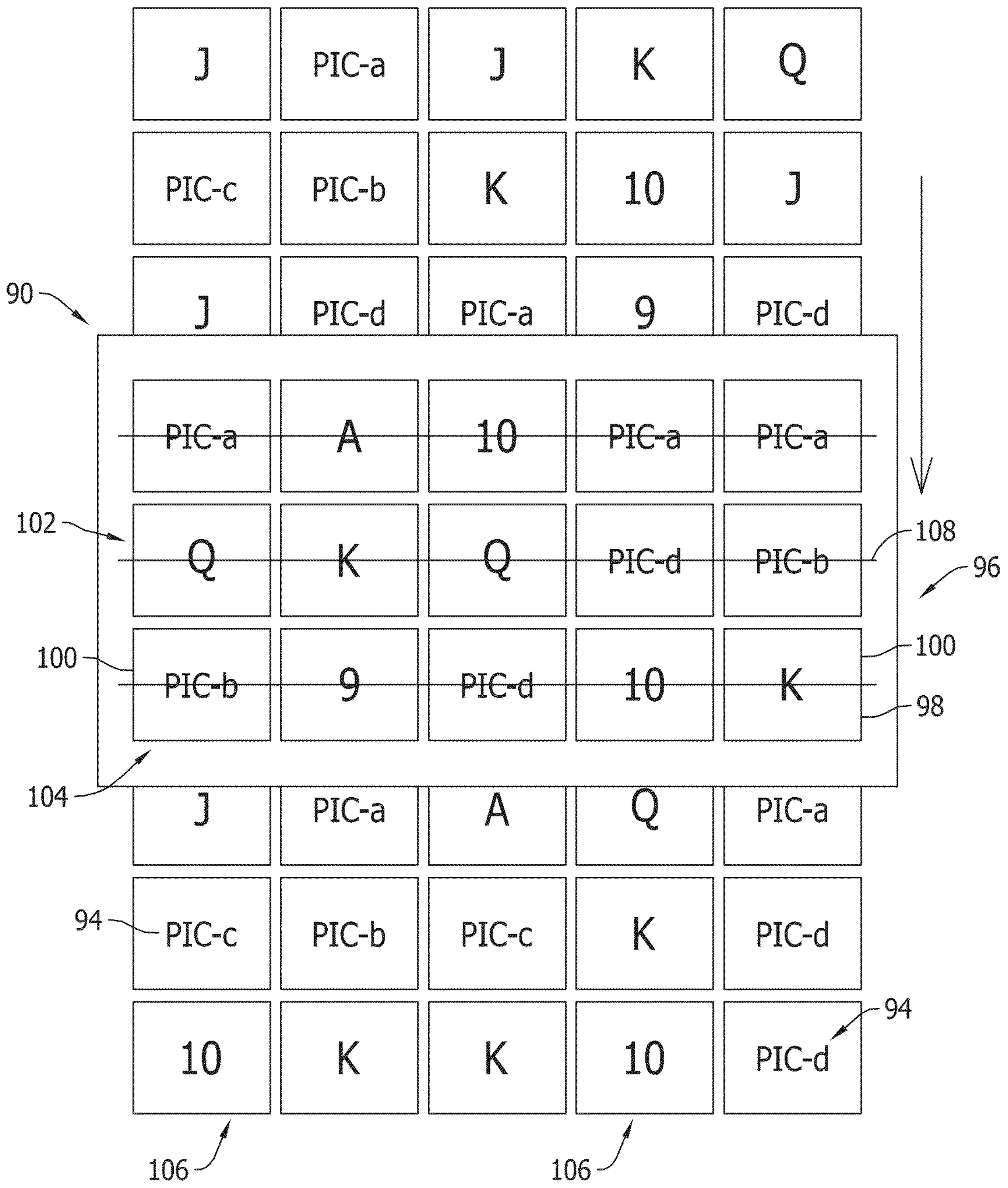
FIG. 5 is a schematic representation of a portion of the gaming device shown in FIG. 1 including the slot game shown in FIG. 3 illustrating a plurality of slot reels, according to an embodiment of the present invention.

FIG. 3 is a flowchart of a method 200 that may be used with the gaming device 10 allowing a player to play a game having player selectable awards via the gaming device 10. The method 200 includes a plurality of steps. Each method step may be performed independently of, or in combination with, other method steps. Portions of the method 200 may be performed by any one of, or any combination of, the components of the gaming device 10. FIG. 4 is an exemplary entertaining graphical display of the slot game 56 that may be played with the gaming device 10. FIG. 5 is a schematic representation of a portion of the gaming device 10 including the slot game 56. FIGS. 6-9 are exemplary entertaining graphical displays of an award selection screen 88 that may be displayed via the gaming device 10.

In the illustrated embodiment, in method step 202, the gaming controller 16 allows a player to make a wager associated with a primary game 90 and responsively displays the primary game 90 on the display device 12. In one embodiment, the primary game 90 is a video slot game. However, it should be noted that the primary game 90 may be any type of game upon which a player could make a wager including, but not limited to a keno game, a blackjack game, a video poker game, or any type of game that enables the gaming controller 16 to function as described herein. In addition, in one embodiment, the primary game 90 may include a slot game being displayed with a plurality of mechanical reels (not shown). In the illustrated embodiment, the gaming controller 16 displays the primary game 90 on the first display 52. In another embodiment, the gaming controller 16 displays the primary game 90 on the first display 52 and/or the second display 54.

In method step 204, the gaming controller 16 randomly generates an outcome 92 of the primary game 90 and displays the generated game outcome 92 in the game screen 58. The gaming controller 16 randomly selects a plurality of game symbols 94 from a predefined set of possible game symbols and displays the selected game symbols 94 associated with the generated game outcome 92 in the game screen 58. In the illustrated embodiment, the plurality of symbols 94 are displayed in a display area 96 that includes a grid 98 having a plurality of cells 100 arranged along a plurality of rows 102 and a plurality of columns 104. Each cell 100 displays one or more game symbols 94 associated with the game outcome 92. In the illustrated embodiment, the gaming controller 16 displays the game symbols 94 within a plurality of reels 106. Each reel 106 is associated with a corresponding column 104. The primary game 90, in the illustrated embodiment, includes 5 reels 106 with 3 cells per reel, respectively (a "5×3" arrangement) displayed in the display area 96. Alternatively, other reel arrangements may be used such as, for example, 3-4-3-4-3, 4-5-5-5-4, or 4-5-4-5-4 arrangements or arrangements with the same number of cells per column, such as 3×3, 3×4, 4×5, or 5×5 configurations. The primary game 90 also includes a plurality of paylines 108 that extend across one or more cells 100 to indicate, to the player, a combination of game symbols 94.

Each primary game 90 is generally played in a conventional manner. The player makes a wager, which may be based on a predetermined denomination and a selected number of paylines 108, the gaming controller 16 randomly generates an outcome for the primary game 90, spins the reels 106, and selectively stops the reels 106 to display a game symbol 94 in each of the display cells 100. If a predetermined pattern of symbols 94 is randomly chosen for each cell 100 on a played payline 108, the player may be awarded a payout based on the payline, the wager, and a predetermined paytable. Moreover, the player may be awarded a payout if the combination of symbols 94 associated with a selected payline 108 is a winning combination. In addition, a player may receive a bonus feature, bonus games, and/or free games based on the combination of symbols 94 associated with the selected payline 108 and/or the appearance of one or more special symbols 110 in the game outcome 92. Many variations to the above described general play of a slot game fall within the scope of the present invention. Such slot games are well-known in the art, and are therefore not further discussed.

In the illustrated embodiment, the gaming controller 16 receives a signal, from the user input device 14, that is indicative of a player's selection to initiate a gaming session including a wager amount, and a selection of one or more paylines 108 associated with a predefined set of cells 100 within the display area 96. In the illustrated embodiment, the primary game 90 is a multi-line game, i.e., the paylines include horizontal paylines and/or diagonal pay-lines, and/or zig-zag paylines. Moreover, the user input device 14 may allow the player to toggle to increase the bet per payline a credit at a time (up to the maximum bet). The gaming controller 16 randomly generates an outcome of the primary game 90, and displays the generated outcome 92 on the game screen 58. In one embodiment, the gaming controller 16 is configured to rotate, and/or spin each reel 106 to initiate a game play, and stop each reel 106 to display a plurality of symbols 94 associated with the randomly generated outcome 92. In addition, the gaming controller 16 is adapted to determine if the generated outcome 92 is a winning outcome as a function of the displayed game symbols 94, a paytable, a wager, and one or more player selected paylines 108. More specifically, the gaming controller 16 determines if a combination of symbols 94 arranged along the selected payline 108 is a winning combination. The gaming controller 16 may provide an award in response to the outcome of the primary game 90.

In method step 206, the gaming controller 16 detects the appearance of a triggering condition in the outcome 92 of the primary game 90 and provides the player a bonus feature 112 (shown in FIGS. 6-11) in response to detecting the triggering condition. In one embodiment, the triggering condition may be defined as a winning combination being formed along a selected payline. In another embodiment, the triggering condition may include an appearance of one or more special symbols 110 being displayed in the outcome 92 of the primary game 90. For example, in one embodiment, the gaming controller 16 may determine an amount of wagering credits accumulated by the player during a gaming session and/or during play of the primary game 90, and determine the triggering condition to occur if the amount of wagering credits is greater than, or equal to, a predefined amount of wagering credits. In another embodiment, the gaming controller 16 may define the triggering condition as a predefined amount of wagering credits placed as a wager during the primary game 90 and/or a predefined number of games played by the player.

Figure 6:
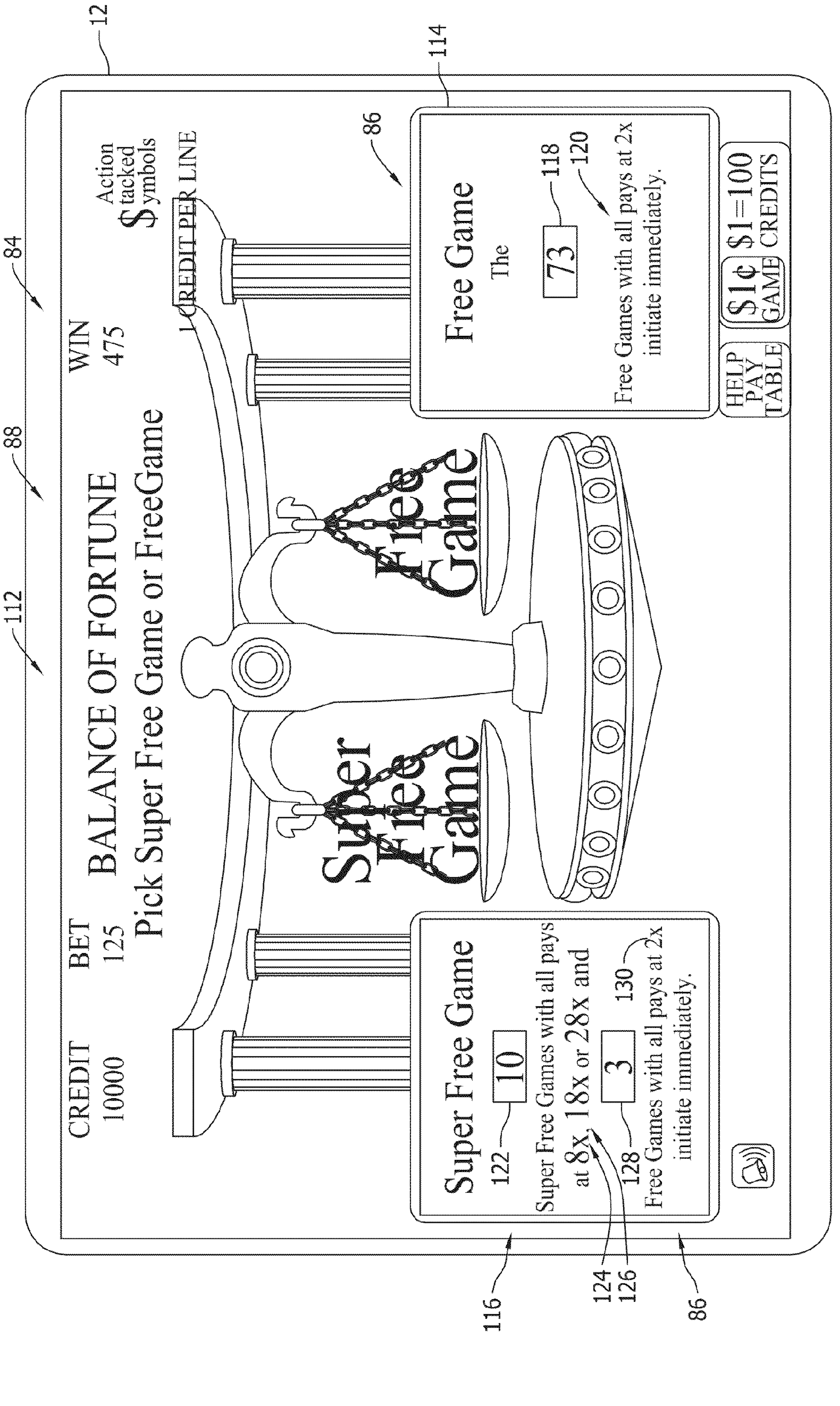
FIGS. 6-9 are exemplary entertaining graphical displays of an award selection screen, according to an embodiment of the present invention.

In method step 208, the gaming controller 16 displays the bonus feature 112 including determining a first award 114 and a second award 116. In method step 210, the gaming controller 16 determines the first award 114 as a function of the primary game outcome 92. In the illustrated embodiment, the gaming controller 16 determines the first award 114 including a first number 118 of free games, e.g. free spins. More specifically, the award module 76 receives the game outcome 92 from the CPU 60 and determines a corresponding number of free games included in the free game table 82 based on the received game outcome 92. In addition, the award module 76 may also determine a first award multiplier 120 that is associated with the corresponding first number 118 of free games and/or the game outcome 92, and assign the first award multiplier 120 to the first award 114 such that each award being associated with an outcome of each of the first number 118 of free games is multiplied by the identified award multiplier. For example, in one embodiment, as shown in FIG. 6, the gaming controller 16 may provide the first award 114 including 73 free games, with a corresponding first award multiplier 120 being equal to a 2× credit award.

In method step 212, the gaming controller 16 determines the second award 116 as a function of the first award 114. For example, in one embodiment, the gaming controller 16 may determine the first award 114 to include a first number 118 of free games and determine the second award 116 to include a second number 122 of free games as a function of the first number 118 of free games. In one embodiment, the award module 76 determines the second number 122 of free games using the following equation:

$$X/D=Y+R/D \qquad \text{Equation (1)}$$

where: Y=second number of free games (expressed as a whole number)

X=first number of free games

D=Divisor

R=Remainder

The award module 76 determines the first number 118 of free games as a result of the game outcome 92 and determines the second number 122 of free games as a function of the first number 118 of free games and the Divisor, D. For example, in one embodiment, the Divisor, D, may be equal to a predefined number of free games such as, for example, 10 free games, and the award module 76 may determine the first number 118 of free games to be equal to 73 free games. Using equation (1), the award module 76 may determine the second number 122 of free games to be equal to 10 free games (i.e. 73/7=10+3/7=10.4285, where X=73, Divisor=7, Y=10, and Remainder=3). In another embodiment, the gaming controller 16 may randomly determine the Division, D.

In the illustrated embodiment, the gaming controller 16 determines the second award 116 including a second award multiplier 124. In one embodiment, the second award multiplier 124 is greater than the first award multiplier 120 to allow the player an opportunity to obtain a larger credit prize during play of the second number 122 of free games included in the second award 116 as compared to the first award 114. In the illustrated embodiment, the second award multiplier 124 is determined as a function of the first award multiplier 120. In one embodiment, the award module 76 determines the second award multiplier 124 using the following equation:

$$M_S=M_O(D)+\alpha \quad \text{Equation (2)}$$

where: $M_S$=second award average multiplier $M_O$=first award multiplier

D=Divisor

α=multiple of a Retriggering probability, where Retriggering probability is the probability of additional free games being awarded in a free game outcome.

For example, in one embodiment, the Divisor, D, may be equal to a predefined number of free games such as, for example, 10 free games, and the award module 76 may determine the first award multiplier, $M_O$, to be equal to 2. The award module 76 may also determine the constant, a, to be equal to 3. Using equation (2), the award module 76 may determine the second award average multiplier, $M_S$, to be equal to 17 (i.e. $M_S$=2(7)+3=17).

In one embodiment, the award module 76 may determine the second award multiplier 124 to be equal to second award average multiplier, Ms. In another embodiment, the award module 76 may select the second award multiplier 124 from a predefined set 126 of award multipliers. In addition, the award module 76 may determine a selection probability being associated with each award multiplier of the predefined set 126 of award multipliers. Each selection probability being determined as a function of the first award multiplier 120. In one embodiment, each award multiplier in the predefined set 126 of award multipliers may include a corresponding selection probability that is determined as a function of the second award average multiplier, $M_S$. For example, the probability of selecting an award multiplier from the predefined set 126 of award multipliers may be provided as in the following chart, where the total second award average multiplier, Ms, is equal to 17. The award multipliers and the corresponding selection probabilities listed in the following chart are for illustrative purposes only and do not limit the scope of the invention as described herein.

| Multiplier Value | Selection Probability | Average Multiplier |
|---|---|---|
| 8 | 38% | 3.04 |
| 18 | 34% | 6.12 |
| 28 | 28% | 7.84 |
| TOTALS | 100% | 17 |

The first column represents the award multipliers included in the predefined set 126 of award multipliers. The second column represents a selection probability associated with each award multiplier. The third column represents the average multiplier value determined as a function of the selection probability multiplied by the corresponding award multiplier. As shown in the table, the sum of the average multiplies values is equal to the calculated second award average multiplier value, Ms, calculated using Equation (2). In the illustrated embodiment, upon selection of the second award 116 by the player, the award module 76 randomly selects the second award multiplier 124 from the predefined set 126 of award multipliers based on the selection probability being associated with each award multiplier in the predefined set 126 as illustrated in the table above. Upon selecting the second award multiplier 124, and award provided to the player based on the outcome of each free game of the second number 122 of free games is determines as a function of the selected second award multiplier.

In another embodiment, the award module 76 may determine the second award multiplier 124 using the following equation:

$$M_S=M_O(D+(D-1)R_{trig}) \quad \text{Equation (3)}$$

where: $M_S$=second award average multiplier $M_O$=first award multiplier

D=Divisor $R_{trig}$=Retriggering probability.

For example, in one embodiment, the Divisor, D, may be equal to a predefined number of free games such as, for example, 10 free games, the award module 76 may determine the first award multiplier, $M_O$, to be equal to 2, and the Retriggering probability, $R_{trig}$, may be equal to 26.146%. Using equation (3), the award module 76 may determine the second award average multiplier, $M_S$, to be equal to 17.1375 (i.e. $M_S$=2×(7+((7−1)×0.26146))=17.1375). In one embodiment, the Retriggering probability may be equal to a predefined probability. In another embodiment, the Retriggering probability may be randomly selected by the award module 76. In addition, the award module 76 may select the second award module 76 from the predefined set 126 of award multipliers having selection probabilities listed in the following table.

| Multiplier Value | Weight | Selection Probability | Average Multiplier |
|---|---|---|---|
| 8 | 9736038 | 37.15% | 2.97 |
| 18 | 8998600 | 34.33% | 6.18 |
| 28 | 7475440 | 28.52% | 7.99 |
| TOTALS | 26210078 | 100% | 17.1375 |

The first column represents the award multipliers included in the predefined set 126 of award multipliers. The second column represents a selection weight being associated with each award multiplier. The third column represents a selection probability associated with each award multiplier. The fourth column represents the average multiplier value determined as a function of the selection probability multiplied by the corresponding award multiplier. As shown in the table, the sum of the average multiplies values is equal to the calculated second award average multiplier value, Ms, calculated using Equation (3).

Figure 7:
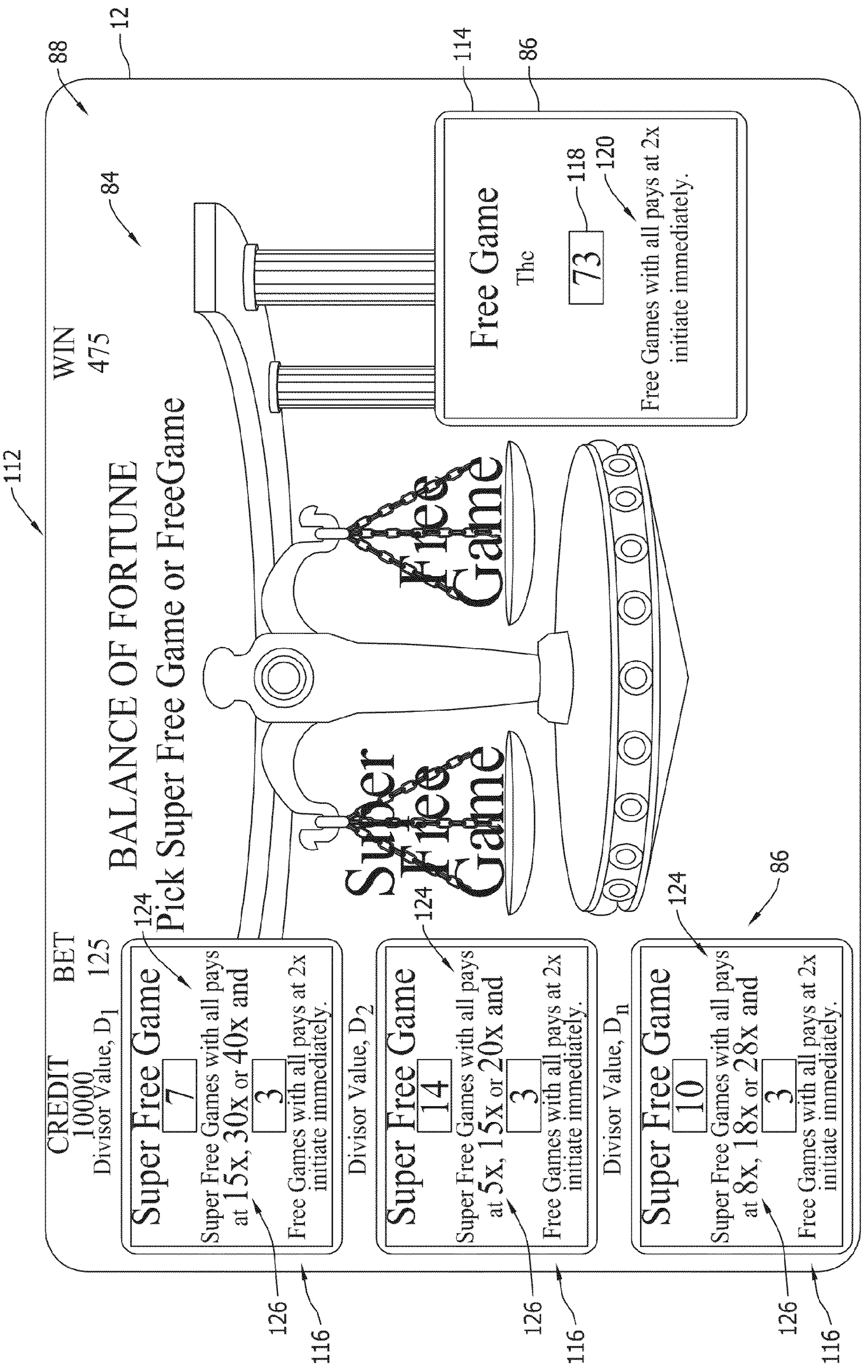
Figure 8:
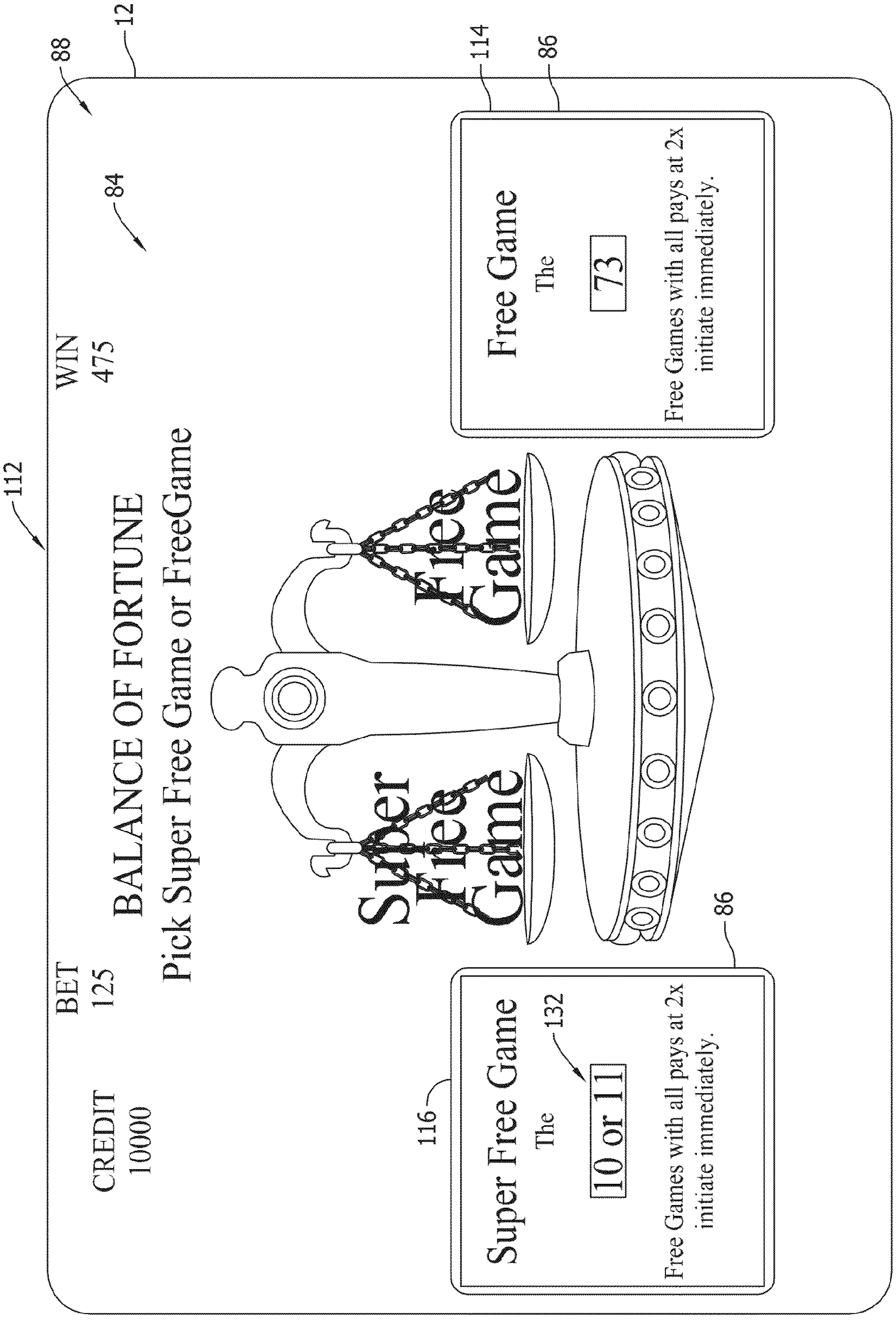

In one embodiment, the gaming controller 16 may determine a plurality of second awards 116 each having a different number of free games. For example, as shown in FIG. 7, the gaming controller 16 may randomly select a plurality of Divisor values, $D_1, D_2, \ldots D_n$, and calculate a second number of free games for each of the selected Divisor values, $D_1, D_2, \ldots D_n$. In addition, the gaming controller 16 may determine a corresponding set 126 of second award multipliers being associated with each of the plurality of second awards 116 as a function of the selected Divisor values, $D_1, D_2, \ldots D_n$, using Equation (2) and/or Equation (3). Moreover, the gaming controller 16 may display a second award 116 associated with each selected Divisor value $D_1, D_2, \ldots D_n$, and allow the player to select between the first award 114 and one of the plurality of second awards 116.

In the illustrated embodiment, the award module 76 may determine the second award 116 to include the second number 122 of free games having the second award multiplier 124 and a third number 128 of free games having a third award multiplier 130. In one embodiment, the third number 128 of free games may be equal to the Remainder value, R, determined using Equation (1). In addition, the award module 76 may determine the third award multiplier 130 to be equal to the first award multiplier 120. Moreover, the award module 76 may randomly determine the third award multiplier 130.

In one embodiment, the award module 76 may determine the selection probabilities associated with each award multiplier as a function of the Remainder value, R, determined from Equation (1). For example, the award module 76 may increase a probability of selecting a larger award multiplier based on the value of the Remainder, R.

In another embodiment, the second number 122 of free games may be selected from a range 132 of free games (shown in FIG. 8) that is determined using Equation (1). For example, the gaming controller 16 may determine a size of the range 132 as a function of the Remainder, R including a minimum number of free games being equal to, Y, from Equation (1) and a maximum number of free games being equal to the sum of Y and Remainder, R. Upon selection of the second award 116. The gaming controller 16 may randomly select the second number 122 of free games from the determined range 132 of free games.

Figure 9:
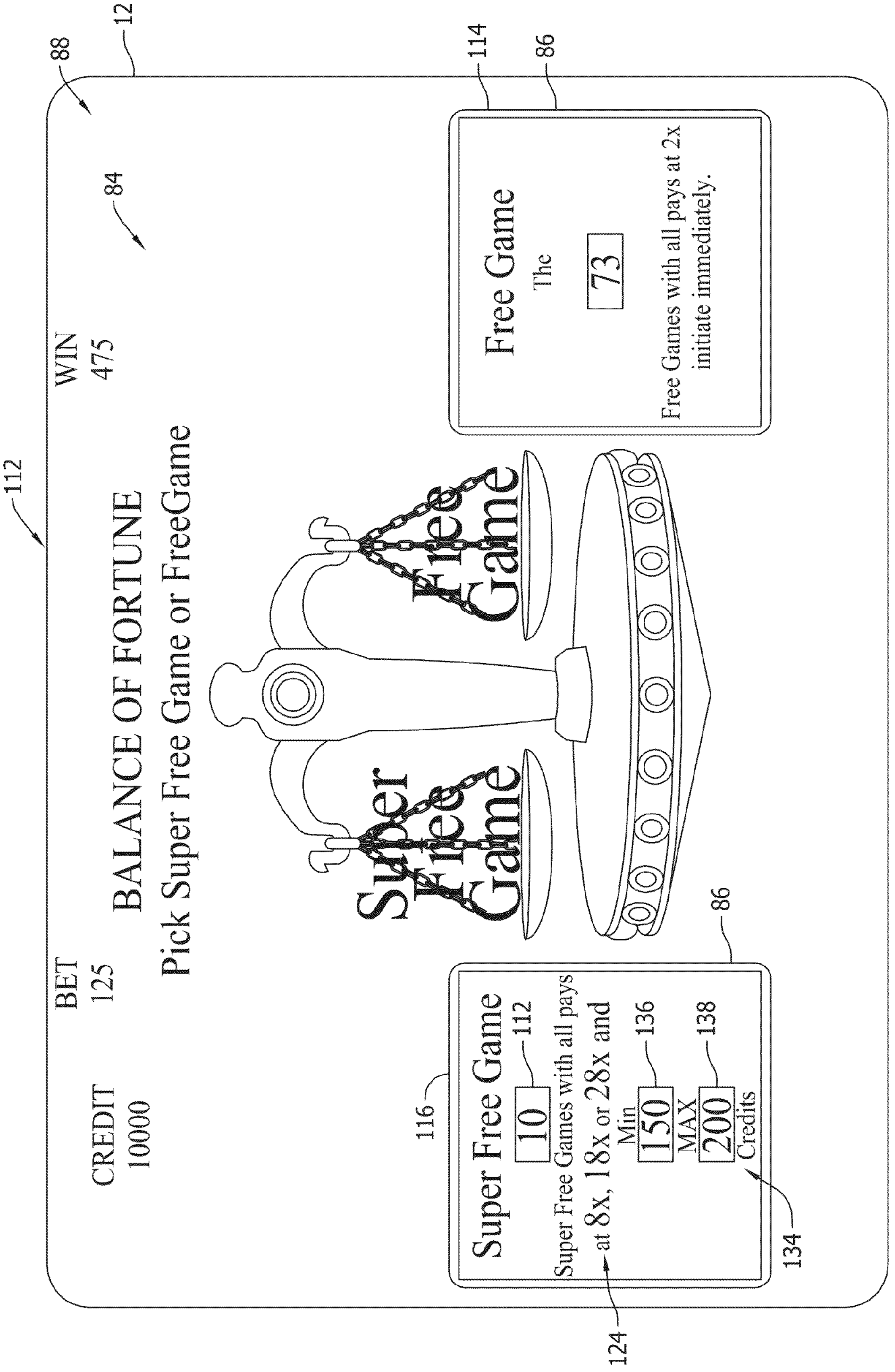

In one embodiment, the award module 76 may determine the second award 116 including an amount of gaming credits 134. For example, as shown in FIG. 9, the gaming controller 16 may determine the second award 116 to include a second number 122 of free spins at a second award multiplier 124 and a number of gaming credits. In the illustrated embodiment, the gaming controller 16 may determine a range of credits between a minimum number of gaming credits 136 and a maximum number of gaming credits 138 to be included in the second award 116. In addition, upon selecting the second award 116, the gaming controller 16 may randomly select an amount of gaming credits with the range of gaming credits and provide player the selected amount of gaming credits with the second award 116. For example, in one embodiment, the gaming controller 16 may determine the range of gaming credits as a function of the first award multiplier 120 and a number of free games equal to the Remainder, R, determined using Equation (1).

In method step 214, the gaming controller 16 displays the award selection screen 88 and allows the player to select at least one of the first award 114 and the second award 116. In one embodiment, the gaming controller 16 defines the triggering condition as a function of a number of free games being awarded to the player based on the primary game outcome 92. Moreover, the gaming controller 16 may determine a number of free games being provided to the player as a function of the primary game outcome 92, and display the award selection screen 88 if the awarded number of free games is greater than, or equal to, a predefined number of free games. For example, during play of the primary game 90, the gaming controller 16 may award the player the first number 118 of free games as a function of the primary game outcome 92, and provide the bonus feature 112 including determining the second award 116 and displaying the award selection screen 88 if the first number 118 of free games is greater than, or equal to the predefined number of free games. In addition, the gaming controller 16 may determine the second number 122 of free games as a function of the first number 118 of free games and the predefined number of free games.

Figure 10:
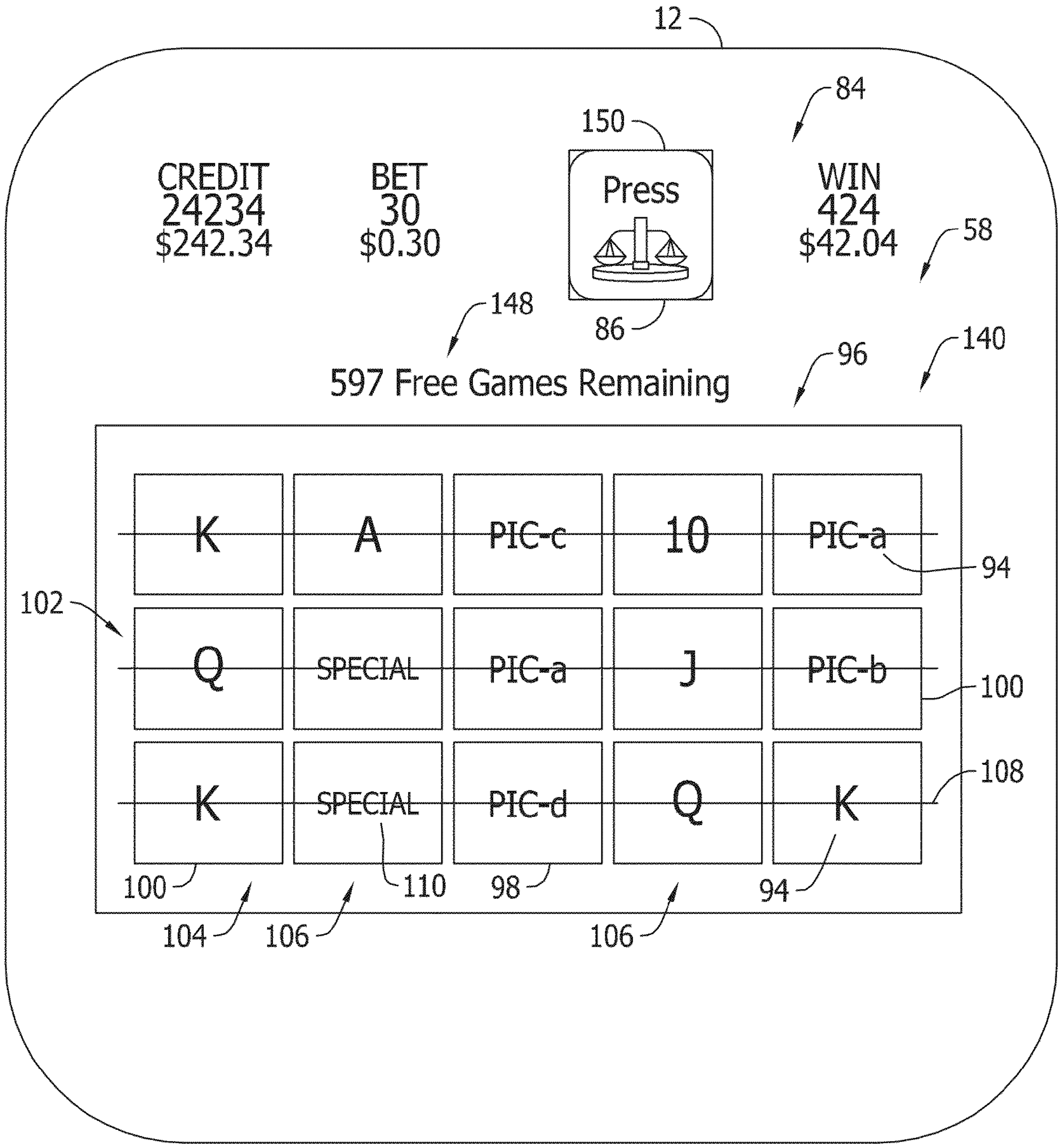
FIG. 10 is another graphical display of the slot game shown in FIG. 4 that may be displayed on the gaming device shown in FIG. 1, according to an embodiment of the present invention.

In method step 216, the gaming controller 16 receives a signal indicative of the player's selection of the first award 114 or the second award 116 and responsively displays the corresponding number of free games 140 on the game screen 58 (shown in FIG. 10). For example, if the player selects the first award 114, the gaming controller 16 randomly generates an outcome for each of the first number 118 of free games and provides an award to the player as a function of each free game outcome and the first award multiplier 120. If the player selects the second award, the gaming controller 16 randomly selects the second award multiplier 124 from the predefined set 126 of award multipliers, randomly generates an outcome for each of the second number 122 of free games and provides an award to the player as a function of each free game outcome and the second award multiplier 124.

In the illustrated embodiment, each free game 140 is played in a similar manner as the primary game 90 and includes a plurality of reels 106 being displayed with a plurality of game symbol 94 and a plurality of paylines 108. In another embodiment, the free game 140 may include, but not limited to a keno game, a bingo game, a blackjack game, a video poker game, or any suitable type of game. During each free game 140, the gaming controller 16 randomly generates an outcome of the free game 140 and spins and stops the reels 106 to display the outcome on the game screen 58. In one embodiment, the gaming controller 16 may automatically play each free game 140 without requiring the player's input, and sequentially display the outcome of each free game 140 to the player. In another embodiment, the gaming controller 16 may require the player to initiate each free game 140 via the user input device 14.

In method step 218, during each free game 140, the gaming controller 16 allows the player to select a modified bonus feature 142 (shown in FIG. 11) to enable the player to select between a modified first award 144 and a modified second award 146. More specifically, in the illustrated embodiment, the gaming controller 16 determines a remaining number 148 of free games available to the player and allows the player to select the modified bonus feature 142 if the remaining number 148 of free games is greater than, or equal to, a predefined number of free games. For example, as shown in FIG. 10, in one embodiment, after an outcome of a free game 140 is displayed, the gaming controller 16 determines if the remaining number 148 of free games is greater than the predefined number of free games and responsively displays a bonus feature selection indicator 150 to the player on the game screen 58. Upon selection of the bonus feature selection indicator 150 by the player, the gaming controller 16 determines a modified first award 144 as a function of the remaining number 148 of free games and determines a modified second award 146 as a function of the modified first award 144. In the illustrated embodiment, the gaming controller 16 determines the modified first award 144 including a modified first number 118 of free spins being equal to the remaining number 148 of free spins, and determines the modified second award 146 including a modified second number 122 of free spins as a function of the modified first number 118 of free spins using Equation (1).

Figure 11:
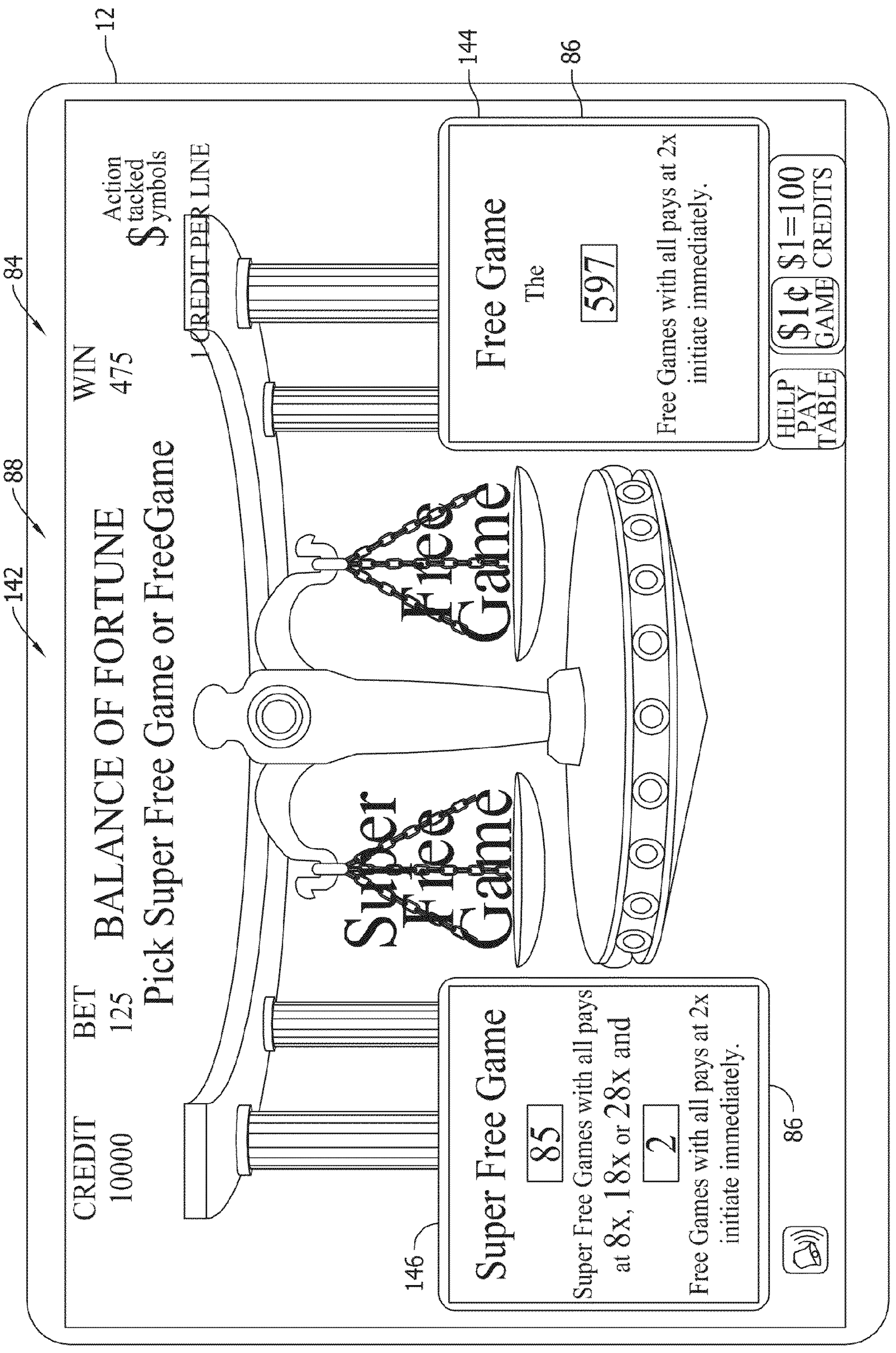
FIG. 11 is another graphical display of an award selection screen, according to an embodiment of the present invention.

FIG. 11 is a schematic view of an exemplary gaming system 160. The gaming system 160 includes a system controller 162 and one or more gaming devices 10 that are coupled to the system controller 162. In one embodiment, the gaming device 10 may include a gaming machine installed in a casino. In another embodiment, the gaming device 10 may include a personal computer, laptop, cell phone, smartphone, tablet computer, personal data assistant, and/or any suitable computing device that enables a player to connect to the system controller 162 to play the game 56.

In the illustrated embodiment, the system controller 162 is configured to perform all of the functions of the gaming controller 16 as described herein. The system controller 162 communicates with each gaming device 10 for playing the game 56 on each gaming device 10 based on user selection input received from each gaming device 10. In the illustrated embodiment, the system controller 162 plays a separate instance of the game 56 on each gaming device 10 such that each player associated with the gaming devices 10 may play a separate instance of the game 56 simultaneously.

In the illustrated embodiment, the gaming devices 10 and the system controller 162 are coupled in communication with a local area network (LAN) 164. Alternatively, the gaming devices 10 and the system controller 162 may be coupled via a network such as, for example, an Internet link, an intranet, a WAN, dial-in-connections, cable modems, wireless modems, and/or ISDN lines. In the illustrated embodiment, the gaming system 160 includes four gaming devices 10, which in one embodiment as shown in FIG. 11 are arranged in a bank 166, i.e., are arranged together, adjacently. It should be noted, however, that the gaming system 160 may include any number of gaming devices 10 that may be arranged in any manner, such as in a circle or along a curved arc, or positioned within separate areas of a casino floor, and/or separate gaming establishments such as different casinos. Furthermore, additional groups of gaming devices 10 may be coupled to the system controller 162. In addition, in the illustrated embodiment, the gaming system 160 may also include a central display 168 that is coupled to the system controller 162 for displaying games played on one or more of the gaming devices 10.

In one embodiment, the system controller 162 may be implemented by one of the gaming controllers 16 associated with a gaming device 10. In still another embodiment, the system controller 162 may be located remotely with respect to the gaming devices 10, or within one of the gaming device cabinet assemblies 18 (shown in FIG. 1).

In one embodiment, the system controller 162 may also determine if a bonus triggering event occurs in a game outcome being played at one or more of the gaming devices 10, and displays the bonus feature 112 and/or the free games 140 on the central display 168 if the bonus triggering event occurs. Alternatively, the system controller 162 may display the bonus feature 112 and/or the free games 140 at one or more gaming devices 10 based on one or more bonus triggering events occurring in games played at the gaming devices 10. The bonus triggering event may be the appearance of a predefined symbol and/or a predefined symbol combination in a game outcome.

Figure 12:
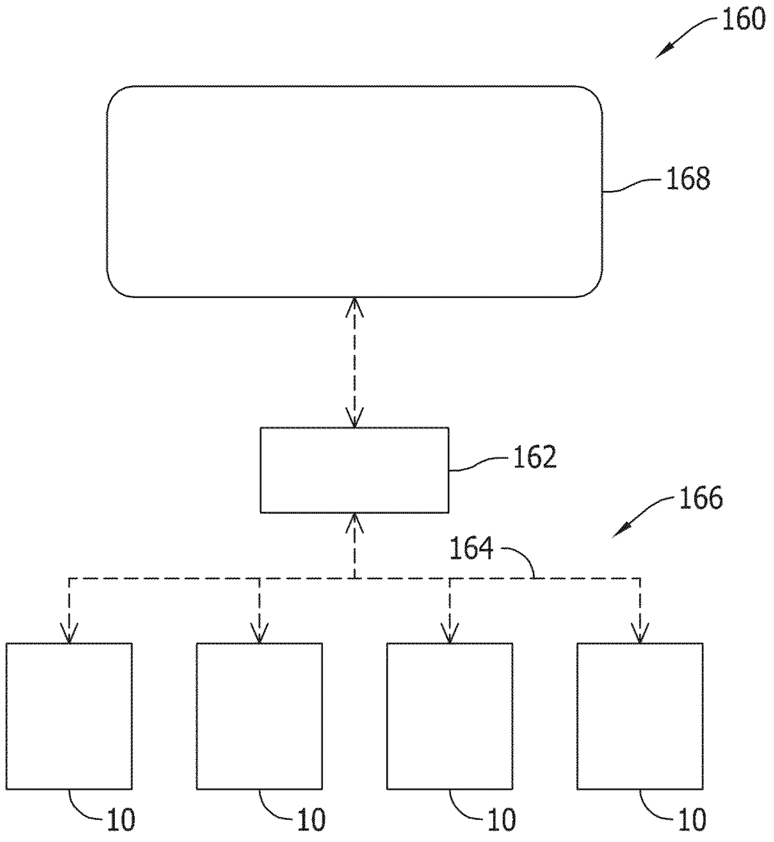
FIG. 12 is a schematic view of an exemplary gaming system of the present invention; and, FIG. 13 is a schematic view of another gaming device that may be used to display the slot game shown in FIGS. 4-11.
Figure 13:
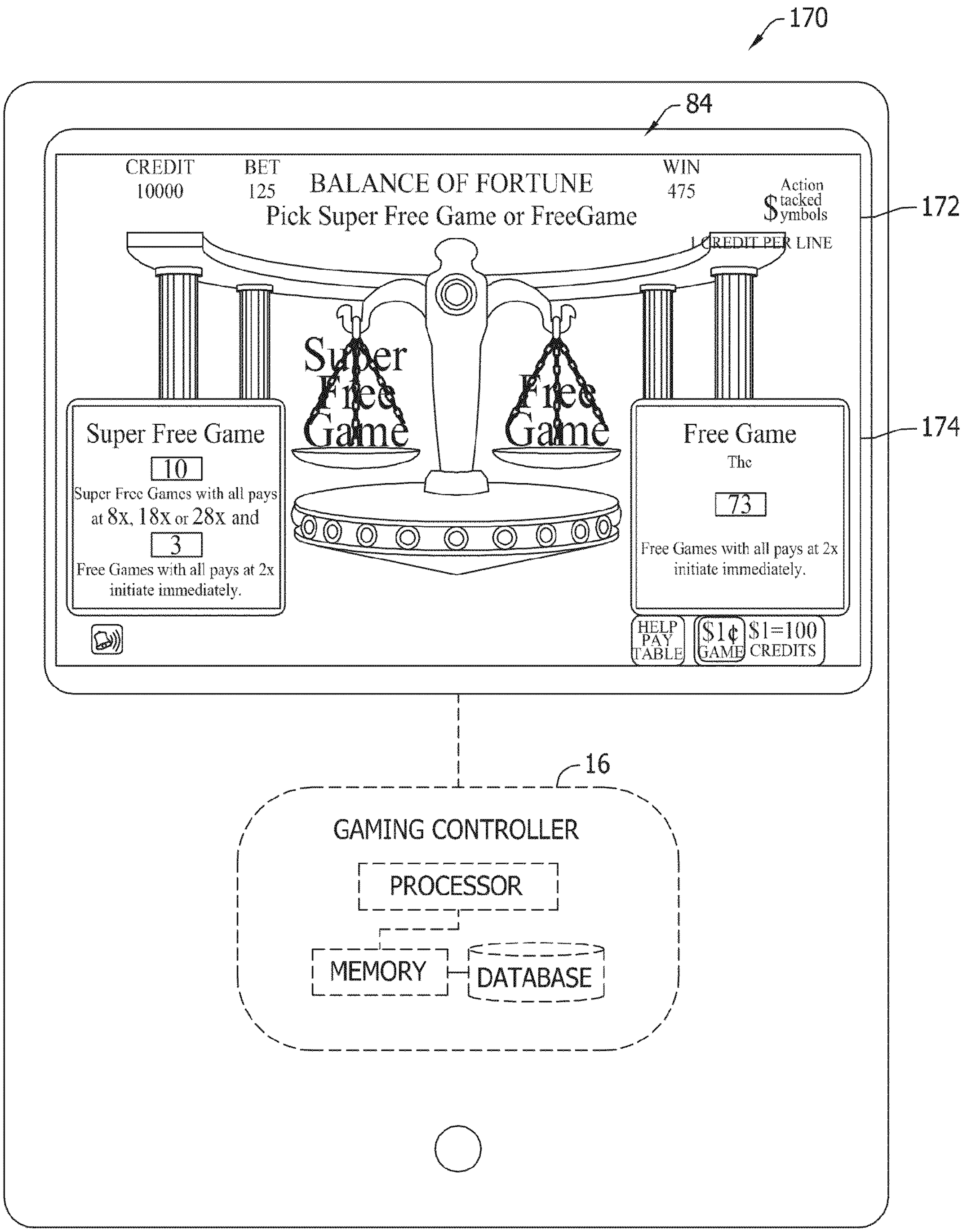

FIG. 12 is a schematic view of another gaming device 170 for allowing a player to play the game 56, according to an embodiment of the invention. In the illustrated embodiment, the gaming device 170 may be a smartphone, a personal computer, laptop, cell phone, tablet computer, smartphone/tablet computer hybrid, personal data assistant, and/or any suitable computing device that displays graphical interfaces 84 that enable the user to play the game 56. In the illustrated embodiment, the gaming device 170 includes a display device 172 such as, for example, the display device 12, a user input device 174 such as, for example, user input device 14, and the gaming controller 16 coupled to the display device 172 and the user input device 174.

The gaming controller 16 includes the processor 60 and the memory device 78 that is coupled to the processor 60. The memory device 78 stores programs and information used by the processor 60 including, but not limited to, image data for producing images and/or screens on the display device 172, game indicia, symbol weights, paytables, and/or winning combination tables which represent relationships between combinations of random numbers, combinations of symbol matches and types of awards associated with the game 56

The processor 60 includes a computer readable medium, such as, without limitation, random access memory (RAM), read-only memory (ROM), erasable programmable read-only memory (EPROM), flash memory, a hard disk drive, a solid state drive, a diskette, a flash drive, a compact disc, a digital video disc, and/or any suitable device that enables the gaming controller 16 to store, retrieve, and/or execute instructions and/or data. The gaming controller 16 in particular executes a game program to implement the method 200 and thereby conducts the game 56 in accordance with the embodiments described herein.

The above-described system, apparatus, and methods overcome at least some disadvantages of known gaming devices by providing a bonus feature that allows the player to select awards to be provided to the player. The gaming device determines a plurality of awards as a function of an outcome of a main game and allows the player to select one of the plurality of awards to be provided to the player during a bonus game. For example, the gaming device may provide the first award including a first number of free spins at a first award multiplier and determine the second award to include a lower number of free spins at a higher award multiplier as compared to the first award. In addition, after each free game is displayed, the gaming device determines a remaining number of free games and displays a bonus feature selection indicator that allows the player to display a bonus selection screen to again make a selection between different awards. By allowing the player to select the first award or the second award, the excitement of the player is increased by allowing the player to select a potentially higher award payout. Moreover, by increasing player involvement during a free spin, the gaming device increases the player's interaction during the free game mode and increases the player's involvement in the type of award being provided to the player. Thus, the amount of time that the game is played by patrons of a gaming establishment is thereby increased.

Exemplary embodiments of a gaming device, a gaming system, and a method of allowing a player to play a gaming device are described above in detail. The gaming device, system, and method are not limited to the specific embodiments described herein, but rather, components of the gaming device and/or system and/or steps of the method may be utilized independently and separately from other components and/or steps described herein. For example, the gaming device may also be used in combination with other gaming systems and methods, and is not limited to practice with only the gaming device as described herein. Rather, an exemplary embodiment can be implemented and utilized in connection with many other gaming system applications.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A gaming machine for providing a slot game to a player, including:

a display device for displaying a game to a player, the game including a plurality of reels being displayed in a grid;

an input device which accepts physical media indicating a monetary value to establish a credit balance; and a controller coupled to the display device, the controller configured to:

allow the player to make a wager on the game and adjust the credit balance by an amount of the wager;

randomly determine an outcome of the game and spin and stop the reels to display the outcome on the display device;

determine a first award as a function of the outcome, the first award including a first number of free games and a first award multiplier being associated with the first number of free games;

determine a second award as a function of the first award, the second award including a second number of free games including a second award multiplier being associated with the second number of free games and a third number of free games including a third award multiplier being associated with the third number of free games, the second number of free games being determined as a function of the first number of free games and a divisor value equal to a predefined number of free games, the second award multiplier being determined as a function of the first award multiplier and a retriggering probability indicating a probability of additional free games being awarded during play of the second number of free games;

display an award selection on the display device, the award selection including the first award and the second award and allow the player to select one of the first award and the second award;

responsively provide the selected one of the first award and the second award to the player;

initiate play of the selected award including randomly generate an outcome of at least one free game associated with the selected award in response to the player's selection;

spin and stop the reels to display the outcome of the at least one free game;

determine a remaining number of free games associated with the selected award;

determine a modified first award and a modified second award as a function of the remaining number of free games; and allow the player to select one of the modified first award and the modified second award during play of the previously selected award.

2. A gaming machine in accordance with claim 1, at least one of the first and second awards having a varying parameter.

3. A gaming machine in accordance with claim 1, the controller configured to randomly select the second award multiplier from a predefined set of award multipliers.

4. A gaming machine in accordance with claim 3, the controller configured to:

determine a second award average multiplier as a function of the first award multiplier, the retriggering probability, and the divisor value;

determine a selection probability associated with each award multiplier of the predefined set of award multipliers as a function of the second award average multiplier; and randomly select the second award multiplier from the predefined set of award multipliers as a function of each corresponding selection probability.

5. A gaming machine in accordance with claim 1, the third award multiplier being different from the second award multiplier.

6. A gaming machine in accordance with claim 1, the second award including an amount of gaming credits for use in playing the game.

7. A gaming machine in accordance with claim 1, the controller configured to:

determine the first number of free games as a function of the outcome; and display the award selection if the determined first number of free games is greater than the divisor value.

8. A gaming machine in accordance with claim 7, the controller configured to randomly select the divisor value from a plurality of different divisor values.

9. A method of allowing a player to play a slot game with a gaming machine including a display device and a controller, the method including the steps of:

displaying, on a display device, a game including a plurality of reels being displayed in a grid;

allowing the player, through an input device which accepts physical media indicating a monetary value to establish a credit balance, to make a wager on the game;

adjusting, by the controller, a credit balance as a function of an amount of the wager;

randomly determining, by the controller, an outcome of the game and spinning and stopping the reels to display the outcome on the display device;

determining a first award as a function of the outcome, the first award including a first number of free games and a first award multiplier being associated with the first number of free games;

determining a second award as a function of the first award, the second award including a second number of free games including a second award multiplier being associated with the second number of free games and a third number of free games including a third award multiplier being associated with the third number of free games, the second number of free games being determined as a function of the first number of free games and a divisor value equal to a predefined number of free games, the second award multiplier being determined as a function of the first award multiplier and a retriggering probability indicating a probability of additional free games being awarded during play of the second number of free games;

displaying an award selection on the display device, the award selection including the first award and the second award and allowing the player to select one of the first award and the second award;

responsively providing the selected one of the first award and the second award to the player;

initiating play of the selected award including randomly generating an outcome of at least one free game associated with the selected award in response to the player's selection;

spinning and stopping the reels to display the outcome of the at least one free game;

determining a remaining number of free games associated with the selected award;

determining a modified first award and a modified second award as a function of the remaining number of free games; and allowing the player to select one of the modified first award and the modified second award during play of the previously selected award.

10. A method in accordance with claim 9, at least one of the first and second awards having a varying parameter.

11. A method in accordance with claim 9, including the step of randomly selecting the second award multiplier from a predefined set of award multipliers.

12. A method in accordance with claim 11, including the steps of:

determine a second award average multiplier as a function of the first award multiplier, the retriggering probability, and the divisor value;

determining a selection probability associated with each award multiplier of the predefined set of award multipliers as a function of the second award average multiplier; and randomly selecting the second award multiplier from the predefined set of award multipliers as a function of each corresponding selection probability.

13. A method in accordance with claim 9, the third award multiplier being different from the second award multiplier.

14. A method in accordance with claim 9, the second award including an amount of gaming credits for use in playing the game.

15. A method in accordance with claim 9, including the steps of:

determining the first number of free games as a function of the outcome; and displaying the award selection if the determined first number of free games is greater than the divisor value.

16. A method in accordance with claim 15, including the step of randomly selecting the divisor value from a plurality of different divisor values.

17. One or more non-transitory computer-readable storage media, having computer-executable instructions embodied thereon, wherein when executed by at least one processor, the computer-executable instructions cause the processor to:

display a game to a player on a display device, the game including a plurality of reels being displayed in a grid;

allow the player, through an input device which accepts physical media indicating a monetary value to establish a credit balance, to make a wager on the game;

adjust a credit balance as a function of an amount of the wager;

randomly determine an outcome of the game and spin and stop the reels to display the outcome on the display device;

determine a first award as a function of the outcome, the first award including a first number of free games and a first award multiplier being associated with the first number of free games;

determine a second award as a function of the first award, the second award including a second number of free games including a second award multiplier being associated with the second number of free games and a third number of free games including a third award multiplier being associated with the third number of free games, the second number of free games being determined as a function of the first number of free games and a divisor value equal to a predefined number of free games, the second award multiplier being determined as a function of the first award multiplier and a retriggering probability indicating a probability of additional free games being awarded during play of the second number of free games;

display an award selection on the display device, the award selection including the first award and the second award and allow the player to select one of the first award and the second award;

responsively provide the selected one of the first award and the second award to the player initiate play of the selected award including randomly generate an outcome of at least one free game associated with the selected award in response to the player's selection;

spin and stop the reels to display the outcome of the at least one free game;

determine a remaining number of free games associated with the selected award;

determine a modified first award and a modified second award as a function of the remaining number of free games; and allow the player to select one of the modified first award and the modified second award during play of the previously selected award.

18. The one or more computer-readable storage media according to claim 17, the computer-executable instructions cause the processor to randomly select the second award multiplier from a predefined set of award multipliers.

19. The one or more computer-readable storage media according to claim 18, the computer-executable instructions cause the processor to:

determine a second award average multiplier as a function of the first award multiplier, the retriggering probability, and the divisor value;

determine a selection probability being associated with each award multiplier of the predefined set of award multipliers as a function of the second award average multiplier; and randomly select the second award multiplier from the predefined set of award multipliers as a function of each corresponding selection probability.

20. The one or more computer-readable storage media according to claim 17, the third award multiplier being different from the second award multiplier.

* * * * *